US009780620B2

(12) United States Patent
Melfi et al.

(10) Patent No.: US 9,780,620 B2
(45) Date of Patent: Oct. 3, 2017

(54) COUPLING WITH CONCENTRIC CONTACT AROUND MOTOR SHAFT FOR LINE START SYNCHRONOUS MOTOR

(71) Applicant: Baldor Electric Company, Fort Smith, AR (US)

(72) Inventors: Michael J. Melfi, Richfield, OH (US); Galen E. Burdeshaw, Simpsonville, SC (US)

(73) Assignee: Baldor Electric Company, Fort Smith, AR (US)

( * ) Notice: Subject to any disclaimer, the term of this patent is extended or adjusted under 35 U.S.C. 154(b) by 596 days.

(21) Appl. No.: 14/269,437

(22) Filed: May 5, 2014

(65) Prior Publication Data

US 2014/0239875 A1    Aug. 28, 2014

Related U.S. Application Data

(63) Continuation-in-part of application No. 13/432,237, filed on Mar. 28, 2012, now Pat. No. 9,166,456.

(60) Provisional application No. 61/614,140, filed on Mar. 22, 2012.

(51) Int. Cl.

| | |
|---|---|
| *H02P 6/00* | (2016.01) |
| *F16D 27/00* | (2006.01) |
| *B22D 19/00* | (2006.01) |
| *H02K 7/00* | (2006.01) |
| *H02P 1/46* | (2006.01) |
| *H02K 7/118* | (2006.01) |
| *H02P 15/00* | (2006.01) |

(52) U.S. Cl.
CPC ............. *H02K 7/003* (2013.01); *H02K 7/118* (2013.01); *H02P 1/46* (2013.01); *H02P 15/00* (2013.01)

(58) Field of Classification Search
CPC ........... H02K 7/003; H02K 15/00; H02P 1/46
USPC ......................................... 318/705; 192/21.5
See application file for complete search history.

(56) References Cited

U.S. PATENT DOCUMENTS

| | | | | |
|---|---|---|---|---|
| 2,895,580 A | * | 7/1959 | Badin | ..................... F16D 37/00 |
| | | | | 192/110 R |
| 4,120,388 A | | 10/1978 | Nisley | |
| | | | (Continued) | |

OTHER PUBLICATIONS

International Search Report and Written Opinion for PCT/US2013/032790 dated Jun. 4, 2013.

*Primary Examiner* — Eduardo Colon Santana
*Assistant Examiner* — Gabriel Agared
(74) *Attorney, Agent, or Firm* — Thompson Coburn LLP

(57) ABSTRACT

A method comprises providing a line-start synchronous motor. The motor has a stator, a rotor core disposed within the stator, and a motor shaft. In accordance with a step of the method, a coupling for coupling a load to the motor is provided. The coupling has a motor shaft attachment portion configured to provide substantially concentric contact around the shaft at the end of the motor shaft. The coupling has a load attachment portion configured to operatively connect to a load. In accordance with a step of the method, a load is coupled to the motor with the coupling, and driven from start to at least near synchronous speed during steady state operation of the motor with a load coupled thereto. The motor shaft attachment portion may comprise a bushing assembly with matching and opposed tapered surfaces that cooperate to secure the motor shaft attachment portion around the motor shaft.

12 Claims, 6 Drawing Sheets

(56) References Cited

U.S. PATENT DOCUMENTS

| | | | | |
|---|---|---|---|---|
| 4,967,887 | A | * | 11/1990 | Annacchino ............ F16D 37/02 |
| | | | | 192/103 R |
| 5,758,709 | A | * | 6/1998 | Boyd, Jr. ........... B22D 19/0054 |
| | | | | 164/109 |
| 6,844,652 | B1 | * | 1/2005 | Chu ....................... H02K 1/276 |
| | | | | 310/156.53 |
| 7,422,543 | B2 | | 9/2008 | Ransbarger et al. |
| 2002/0190595 | A1 | * | 12/2002 | Han ....................... H02K 21/46 |
| | | | | 310/156.53 |
| 2003/0178906 | A1 | * | 9/2003 | Weihrauch ................ H02P 1/46 |
| | | | | 310/161 |
| 2004/0035684 | A1 | * | 2/2004 | Fukuoka ................ B65G 13/06 |
| | | | | 198/788 |
| 2009/0062020 | A1 | * | 3/2009 | Edwards ............... F04D 13/021 |
| | | | | 464/89 |
| 2013/0257342 | A1 | * | 10/2013 | Melfi ..................... F16D 37/00 |
| | | | | 318/705 |
| 2013/0264990 | A1 | * | 10/2013 | Umans ..................... H02P 1/46 |
| | | | | 318/705 |

* cited by examiner

COUPLING WITH CONCENTRIC CONTACT AROUND MOTOR SHAFT FOR LINE START SYNCHRONOUS MOTOR

RELATED APPLICATION DATA

This application is a continuation-in-part of application Ser. No. 13/432,237, filed Mar. 28, 2012, currently pending, which claims the benefit of provisional application Ser. No. 61/614,140, filed Mar. 22, 2012, the disclosures all of which are incorporated by reference herein.

STATEMENT REGARDING FEDERALLY SPONSORED RESEARCH OR DEVELOPMENT

This invention was made with Government support under agreement no. DE-FG36-08GO180132 awarded by the Department of Energy. The Government has certain rights in this invention.

BACKGROUND

Synchronous motors, including permanent magnet motors and line-start permanent magnet motors, are typically very efficient. However, synchronous motors such as these typically have limited capability to pull into synchronism loads that have a high torque or high inertia. Accordingly, the benefits in efficiency gains and energy savings ordinarily associated with synchronous motors are not typically achieved in applications having loads with high inertia and/or high torque characteristics. To achieve the benefits of efficiency provided by synchronous motors, for instance, line-start interior pole permanent magnet (LSIPM) motors, a coupling capable of concentrically contacting a shaft of a line-start synchronous motor may be used as an acceptable interface between the LSIPM motor and a high inertia and/or high torque load to improve long term operation of the system.

DESCRIPTION OF THE DISCLOSED EMBODIMENTS

Figure 1:
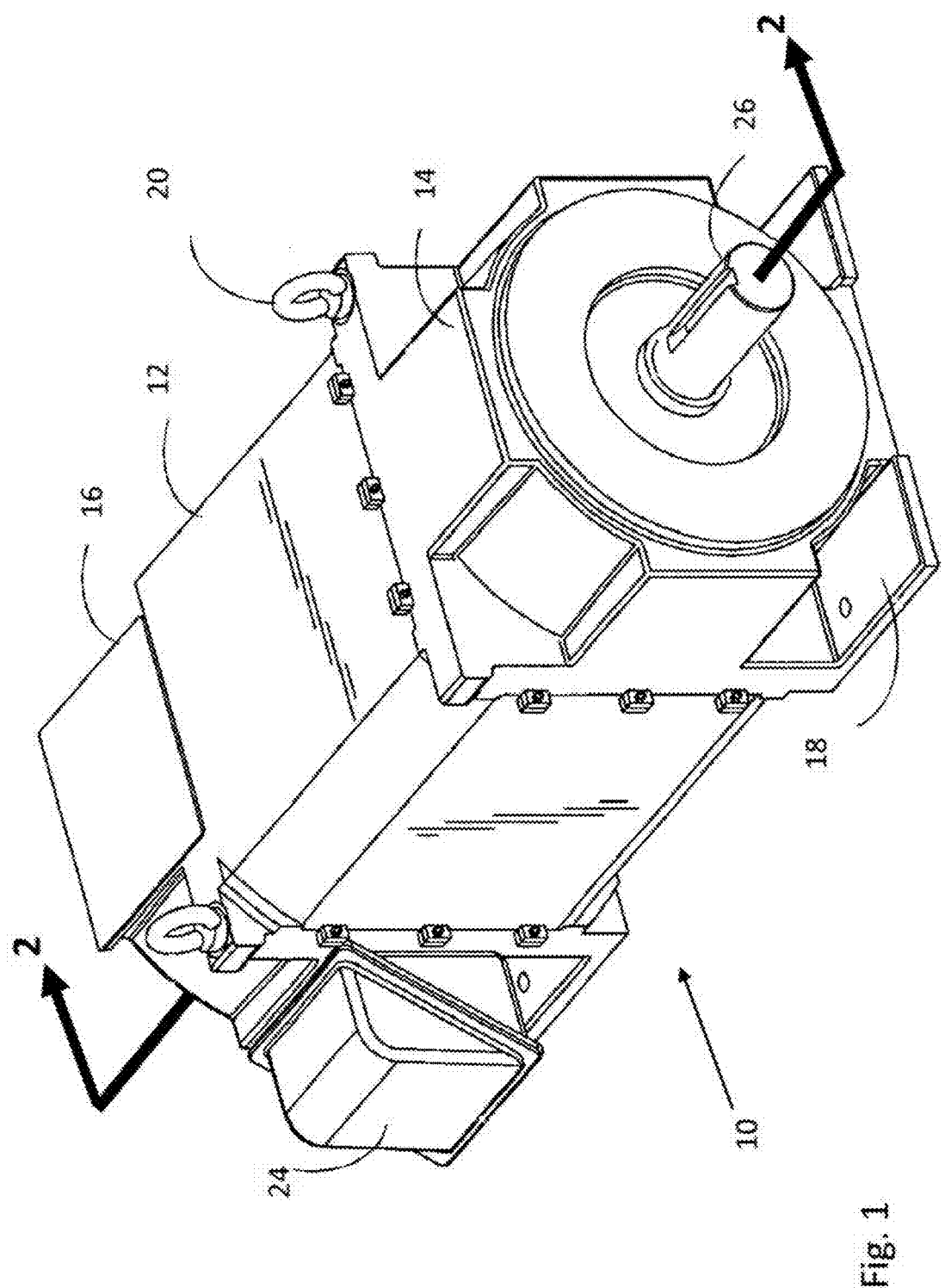
FIG. 1 is a perspective view of a synchronous motor.

Turning to the drawings, FIG. 1 illustrates an exemplary synchronous motor 10. In the embodiment illustrated, the motor 10 comprises a line start permanent magnet motor. The exemplary motor 10 comprises a frame 12 capped at each end by drive and opposite drive end caps 14,16, respectively. The frame 12 and the drive and opposite drive end caps 14,16 cooperate to form the enclosure or motor housing for the motor 10. The frame 12 and the drive and opposite drive end caps 14,16 may be formed of any number of materials, such as steel, aluminum, or any other suitable structural material. The drive and opposite drive end caps 14,16 may include mounting and transportation features, such as the illustrated mounting feet 18 and eyehooks 20.

To induce rotation of the rotor, current is routed through stator windings disposed in the stator. (See FIGS. 2 and 3). Stator windings are electrically interconnected to form groups. The stator windings are further coupled to terminal leads (not shown), which electronically connect the stator windings to an external power source (not shown), such as 480 VAC three-phrase power or 110 VAC single-phase power. A conduit box 24 houses the electrical connection between the terminal leads and the external power source. The conduit box 24 comprises a metal or plastic material, and advantageously, provides access to certain electrical components of the motor 10. Routing electrical current from its external power source through the stator windings produces a magnetic field that induces rotation of the rotor. A motor output shaft 26 is coupled to the rotor.

Figure 2:
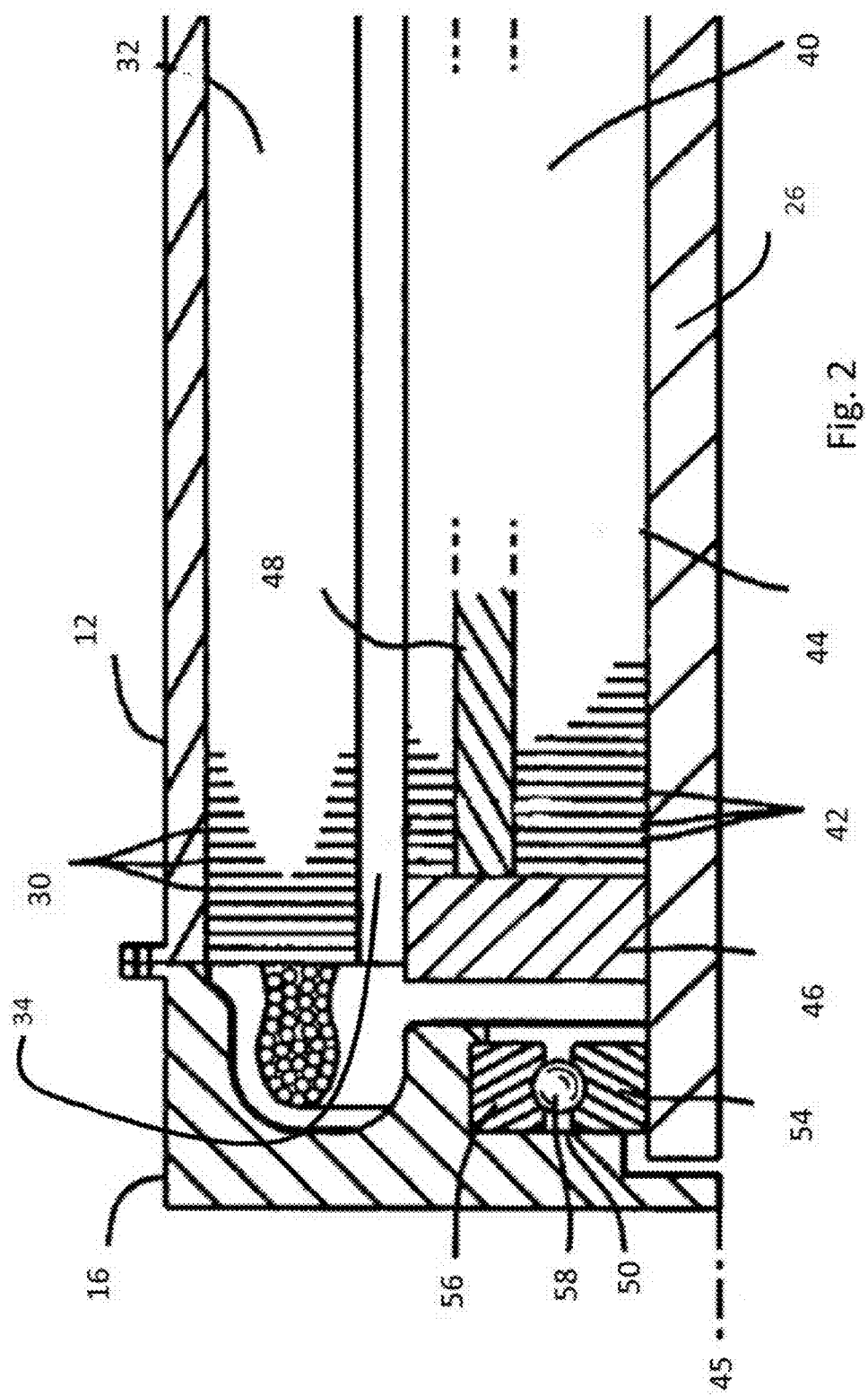
FIG. 2 is a partial cross-sectional view of the left hand side of the motor of FIG. 1 along plane 2-2.
Figure 3:
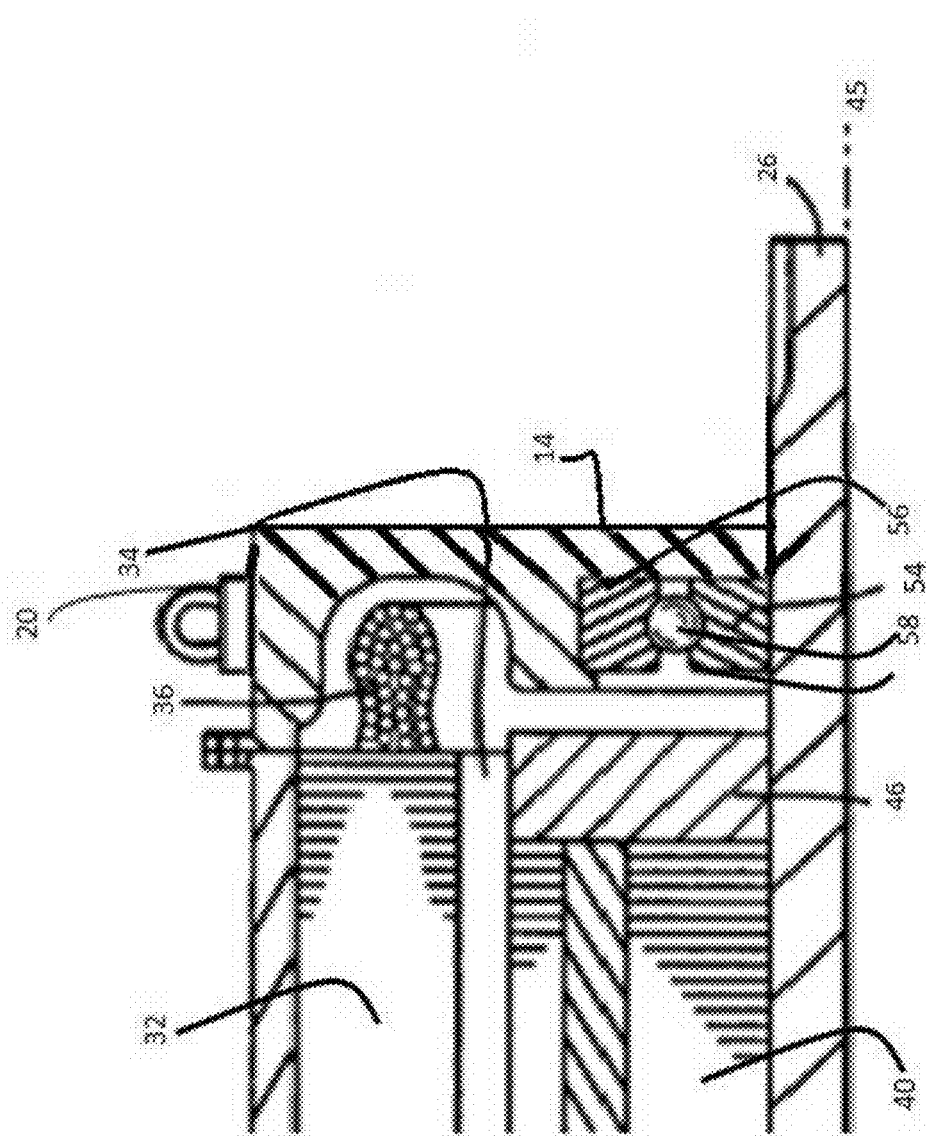
FIG. 3 is a partial cross-sectional view of the right hand side of the motor of FIG. 1 along plane 2-2.

FIG. 2 is a partial cross-section view of the left hand end of the motor 10 as shown in FIG. 1 along plane 2-2. FIG. 3 is a partial cross-section view of one embodiment of the right hand end of the motor 10 as shown in FIG. 1 along plane 2-2. To simplify the discussion, only the top portion of the motor 10 is shown, as the structure of the motor 10 is essentially mirrored along its centerline. As discussed above, the frame 12 and the drive and opposite drive end caps 14,16 cooperate to form an enclosure or motor housing for the motor 10. Within the enclosure or motor housing resides a plurality of stator laminations 30 aligned side by side with respect to one another to form a lamination stack, such as a contiguous stator core 32. In the exemplary motor 10, the stator laminations 30 are substantially identical to one another, and each stator lamination 30 includes features that cooperate with adjacent laminations to form cumulative features for the contiguous stator core 32. For example, each stator lamination 30 includes a central aperture that cooperates with the central aperture of adjacent stator laminations to form a rotor chamber 34 that extends the length of the stator core 32 and that is sized to receive a rotor. Additionally, each stator lamination 30 includes a plurality of stator slots disposed circumferentially about the central aperture. The stator slots cooperate to receive one or more stator windings 36, which are illustrated as coil ends in FIG. 2, that extend the length of the stator core 32.

In the exemplary motor 10, a rotor assembly 40 resides within the rotor chamber 34. Similar to the stator core 32, the rotor assembly 40 comprises a plurality of rotor laminations 42 aligned and adjacently placed with respect to one another. Thus, the rotor laminations 42 cooperate to form a contiguous rotor core 44. When assembled, the rotor laminations 42 cooperate to form a shaft chamber that extends through the center of the rotor core 44 and that is configured to receive the rotor shaft 26 therethrough. The rotor shaft 26 is secured with respect to the rotor core 44 such that the rotor core 44 and the rotor shaft 26 rotate as a single entity about a rotor center axis 45.

The exemplary rotor assembly 40 also includes electrically conductive members, such as rotor bars 48, disposed in the rotor core 44 electrically connected to rotor end members 46 to form the starting cage. The end members 46, which are disposed on opposite ends of the rotor core 44 are generally circular in cross-section and have an outer diameter that generally approximates the diameter of the rotor laminations 42. The rotor bars 48 in cooperation with the end members 46 form at least one closed electrical pathway for induced current within the rotor 40. Accordingly, the rotor bars 48 and the end members 46 comprise materials having good electrical conductivity, such as aluminum and copper.

To support the rotor assembly 40, the exemplary motor 10 includes drive and opposite drive bearing sets 50,52, respectively, that are secured to the rotor shaft 126 and that facilitate rotation of the rotor assembly 40 within the stationary stator core 32. During operation of the motor 10, the bearing sets 50,52 transfer the radial and thrust loads produced by the rotor assembly 40 to the motor housing. Each bearing set 50,52 includes an inner race 54 disposed circumferentially about the rotor shaft 26. The tight fit between the inner race 54 and the rotor shaft 26 causes the inner race 54 to rotate in conjunction with the rotor shaft 26. Each bearing set 50,52 also includes an outer race 56 and rotational elements 58, which are disposed between the inner and outer races 54,56. The rotational elements 58 facilitate rotation of the inner races 54 while the outer races 56 remain stationary and mounted with respect to the drive and opposite drive end caps 14,16. Thus, the bearing sets 50,52 facilitate rotation of the rotor assembly 40 while supporting the rotor assembly 40 within the motor housing, i.e., the frame 12 and the drive and opposite drive end caps 14,16. To reduce the coefficient of friction between the races 54,56 and the rotational elements 58, the bearing sets 50,52 are coated with a lubricant. Although the drawings show the bearing sets 50,52 with balls as rotational elements, the bearing sets may be other constructions, such as sleeve bearings, pins bearings, roller bearings, etc.

Figure 4:
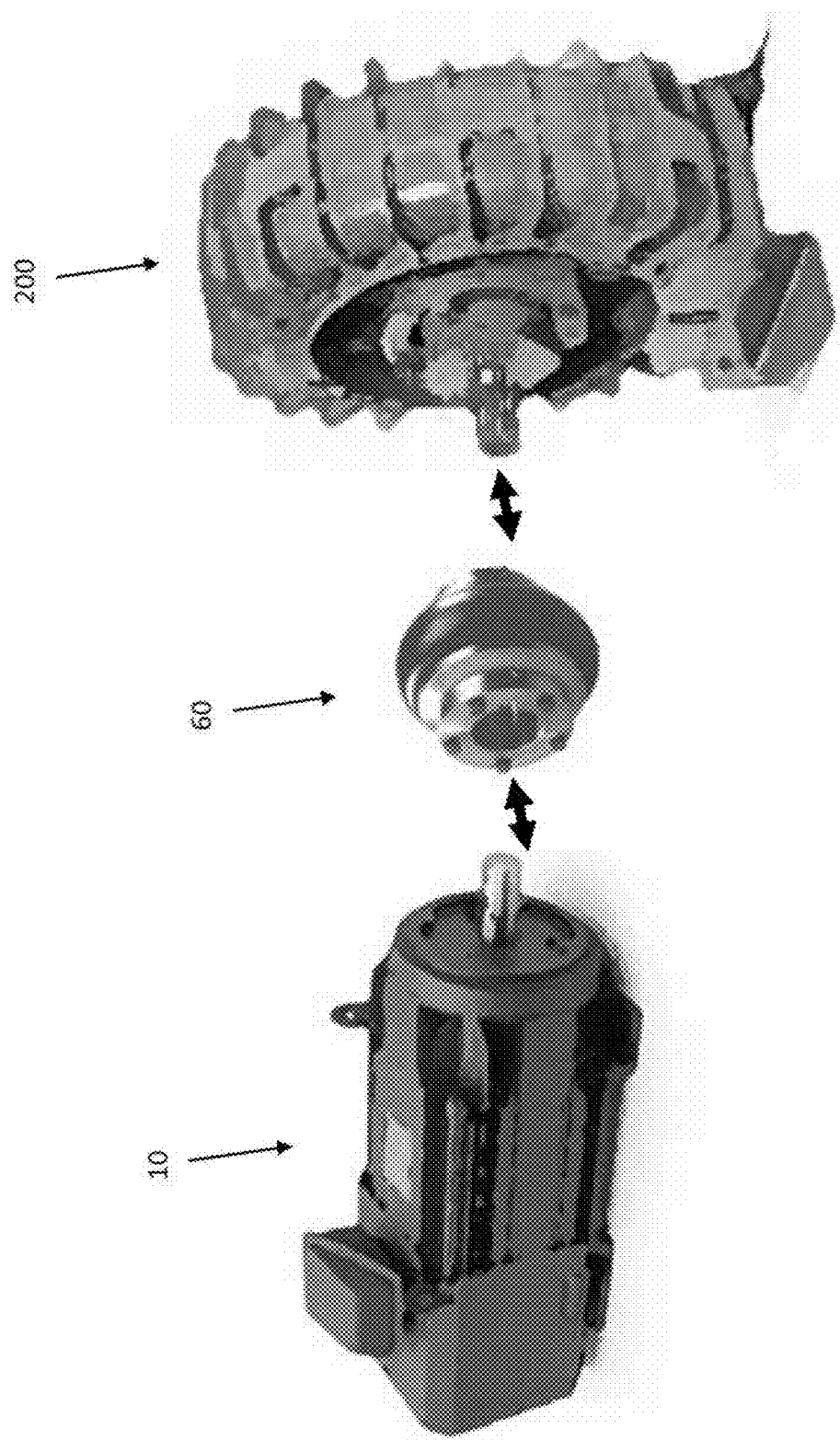
FIG. 4 shows an arrangement involving a synchronous motor of the type shown in FIG. 1 with a coupling and a high torque/high inertia load.

The motor shown in the FIGS. 1-3 may be coupled to a load 200 with a coupling 60 as shown in FIG. 4. The coupling 60 may have a connecting hub 62 which allows the coupling to provide substantially concentric contact around the motor shaft 26. A coupling element capable of concentric contact around the motor shaft may be more robust in withstanding pulsating torque transients frequently experienced during start-up of a system driven by a synchronous motor in comparison to a coupling element employing set screws to secure the coupling element to the motor shaft. Because the coupling is capable of having concentric contact with a motor shaft, greater tolerance ranges may be utilized during the manufacturing of the motor, which may result in savings in the manufacturing of the motor. Because the coupling is capable of having concentric contact with a motor shaft, the system may experience less vibration, and less wear and/or damage and better efficiencies for the equipment coupled to the motor. Additionally, there may be less fretting corrosion and/or less set screw marks on the shaft which may result in savings from less frequent shaft maintenance and replacement. Providing concentric contact around the motor shaft also may eliminate the need to use a key and key way in the shaft, thus allowing a keyless connection between the motor shaft and the coupling.

Figure 5:
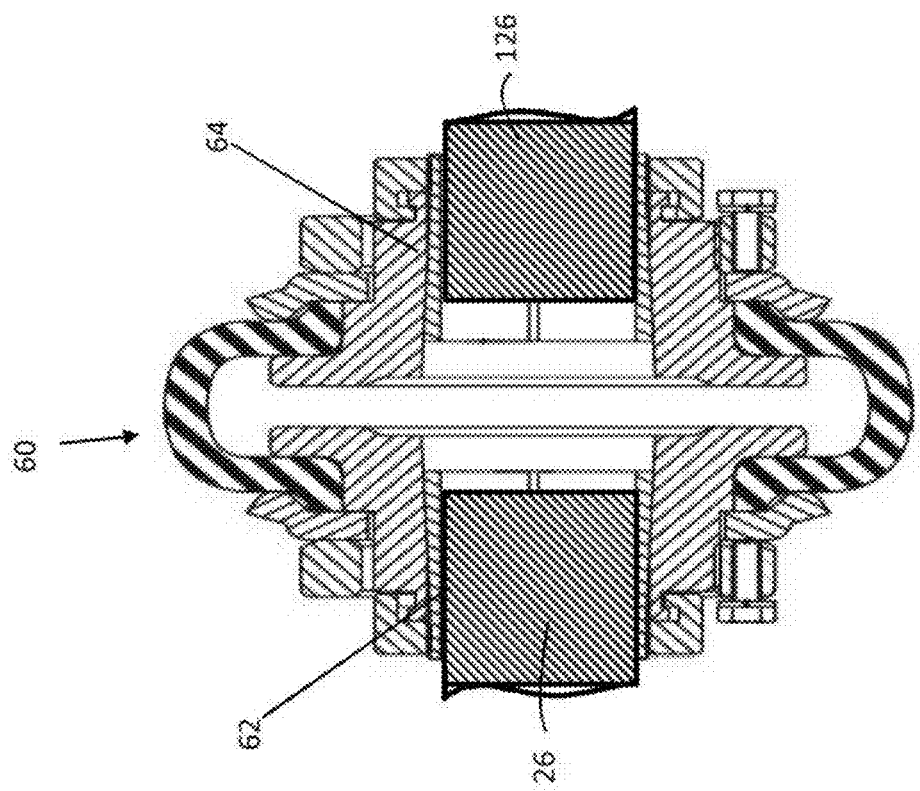
FIG. 5 is a cross-sectional view of an exemplary coupling of the type shown in FIG. 4 capable of concentrically contacting a motor shaft.
Figure 6:
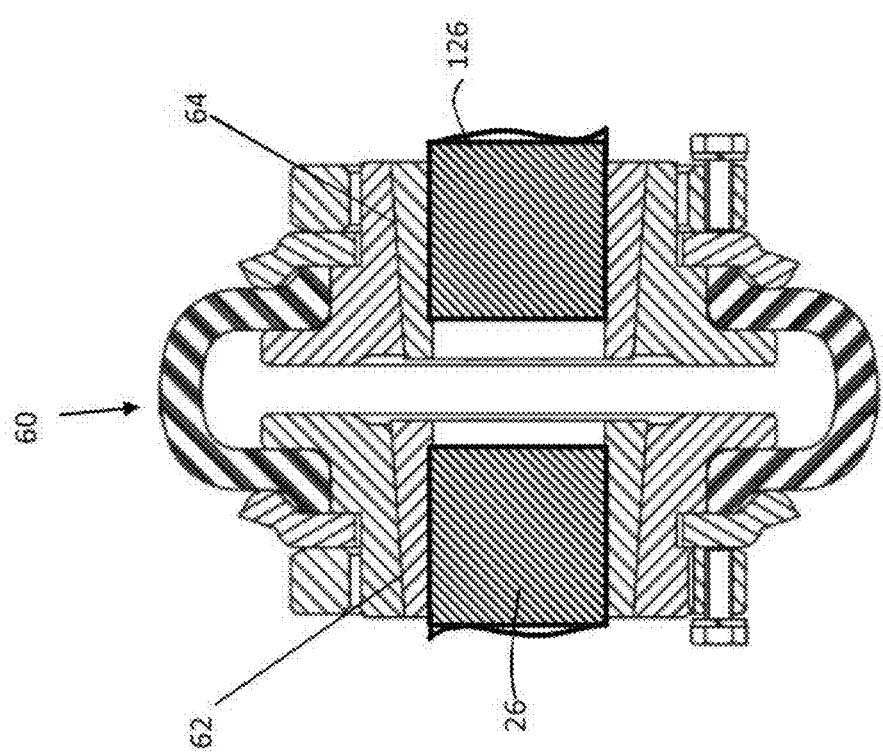
FIG. 6 is a cross-sectional view of another exemplary coupling of the type shown in FIG. 4 capable of concentrically contacting a motor shaft.
Figure 7:
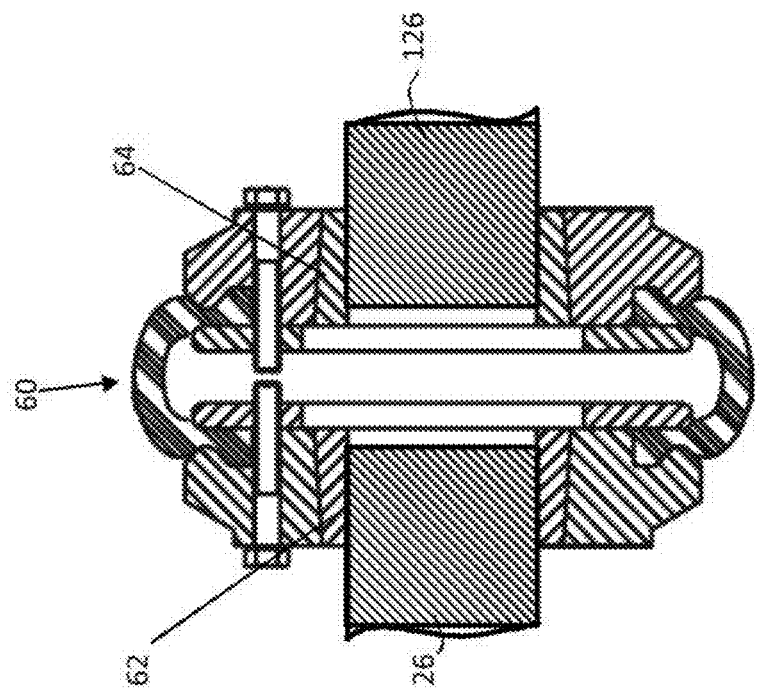
FIG. 7 is a cross-sectional view of another exemplary coupling of the type shown in FIG. 4 capable of concentrically contacting a motor shaft.
Figure 8:
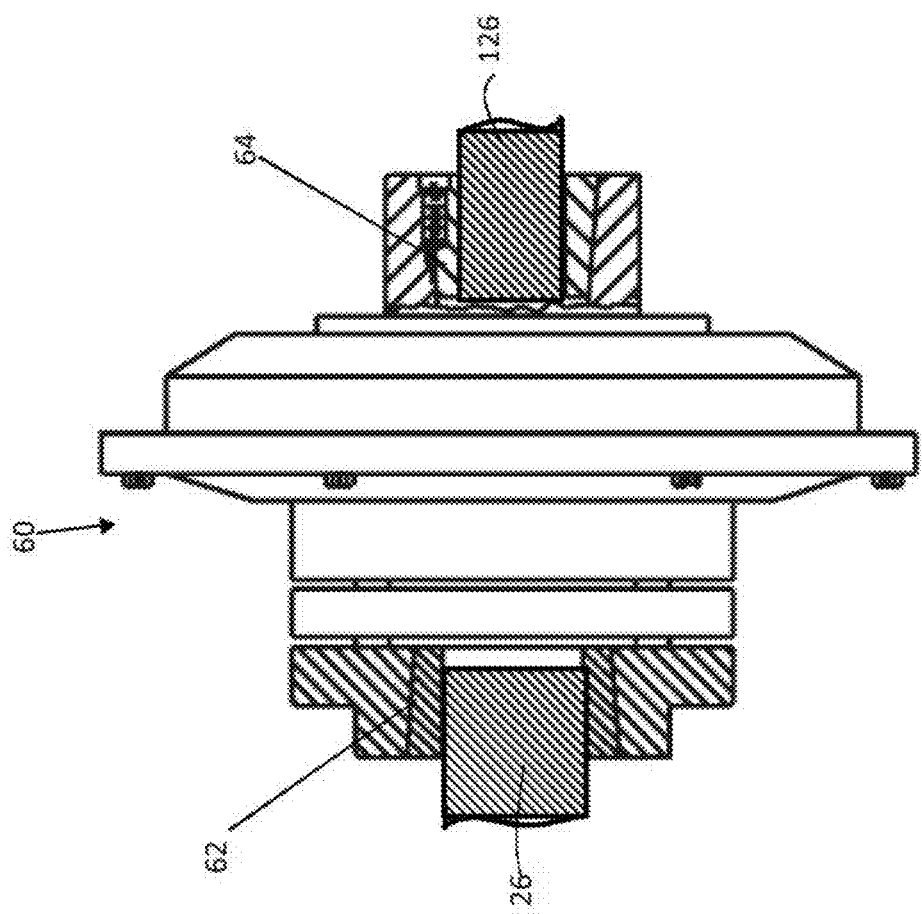
FIG. 8 is a cross-sectional view of another exemplary coupling of the type shown in FIG. 4 capable of concentrically contacting a motor shaft.

FIGS. 5-8 show exemplary coupling elements that may be used as an interface between the synchronous motor that provide substantially concentric contact around the motor shaft 26. These couplings may also provide substantial concentric contact around the load shaft 126. In FIGS. 5-8, the coupling element 60 has connecting or coupling hubs 62,64 that are secured to respective motor and load shafts 26,126 with a system of tapered sleeves. The tapered sleeve forming the coupling hub 62 provides concentric contact with the motor shaft 26. The tapered sleeve forming the coupling hub 64 may provide concentric contact with the load shaft 126. The description that follows is not intended to be limiting in any sense, and is used for purposes of illustration only. Exemplary coupling hubs 62,64 include a Taper Lock™ system or a Grip Tite™ system, both of which are sold by Baldor Electric Company. Features of a Taper Lock™ system are disclosed in U.S. Pat. No. 2,856,211, the disclosure of which is incorporated by reference herein. Features of a GripTite™ system are disclosed in U.S. Pat. No. 7,217,193, the disclosure of which is incorporated by reference herein. By way of example and not in any limiting sense, a coupling which uses these coupling hub systems includes a Dodge™ Paraflex™ GT series coupling (FIG. 5). The Dodge™ Paraflex™ GT series coupling may have a Grip Tite™ bushing or coupling hub 62,64. Another such coupling is a Dodge Paraflex™ GTL series coupling (FIG. 6). The Dodge Paraflex™ GTL series coupling may have an "F" or "H" style Taper Lock™ bushing or coupling hub 62,64. Another such coupling is a Dodge Paraflex™ Standard series coupling (FIG. 7). The Dodge Paraflex™ Standard series coupling may have an "F" or "H" style Taper Lock™ bushing or coupling hub 62,64.

Another example (FIG. 8) is disclosed in parent application Ser. No. 13/432,237, a Flexidyne™ coupling. The Dodge™ Flexidyne™ series coupling may have an "F" or "H" style Taper Lock™ bushing or coupling hub 62,64. As disclosed in the parent application, a soft-start coupling, such as a Flexidyne™ which uses a dry fluid (or alternative embodiments of a soft-start coupling/element which use a magneto-rheological fluid) may be used as an interface between the synchronous motor and a high inertia and/or high torque load to enable the synchronous motor to bring the load up to or near synchronous speed. The soft-start coupling effectively isolates the synchronous motor from the high inertia and/or high torque load for enough time to enable the synchronous motor to come up to full synchronous speed. The soft-start coupling then brings the load up to or near synchronous speed. In the case of a locking type of soft-start coupling, the load speed will eventually be the same as the speed of the synchronous motor. For the case of a soft-start coupling that continues to slip even at steady state, the load speed will only approach but not equal the motor speed. The soft-start coupling enables rapid acceleration of the motor by isolating the load from the motor temporarily until the motor comes up to synchronous speed. A soft start coupling with concentric contact around the motor shaft (such as a Dodge™ Flexidyne™ series coupling with an "F" or "H" style Taper Lock™ bushing or coupling hub) may provide further advantages as described previously.

In addition to these examples, the coupling hubs of the coupling may have a straight bore that is dimensioned to provide an interference fit, or to be shrink fit, with the motor shaft and/or the load shaft. To facilitate installation of coupling designed for an interference fit with the motor shaft, the coupling hubs or other connecting portions of the coupling may be heat shrunk on the motor shaft and/or load shaft.

By way of example, to illustrate the principles of installing the exemplary couplings described above, the coupling may be placed and/or assembled around the respective shaft. Once placed on one of the shaft, the coupling (or it components, i.e, tapered surfaces, attachment portions, bushings, etc.) may be tightened to increase the forces between the components and between the coupling and respective shafts.

As the forces between the components and between the coupling and respective shafts (i.e., the normal forces) increase, so does the maximum frictional force between the shaft and coupling. Frictional force as used herein opposes relative motion between the coupling and shaft up to a maximum force dependent, at least in part, upon the normal force between coupling and shaft.

Because the coupling is capable of concentric contact with the motor shaft, the coupling may improve long term operation of the system when compared to couplings employing keyways and set screws to secure the coupling to the motor shaft. A coupling capable of concentrically contacting a motor shaft may expand the capability and use of a line start synchronous motors to applications previously solely relegated to the use of induction motors. Thus, the efficiency and energy saving of synchronous motors may be achieved in a wide range of applications through the use of a coupling capable of concentrically contacting a motor shaft. Accordingly, conventional couplings may be replaced with couplings capable of concentrically contacting a motor shaft. A coupling capable of concentrically contacting a motor shaft may be provided with dimensions comparable to conventional couplings, to allow a user to replace the conventional coupling with a coupling capable of concentrically contacting a motor shaft without modification of the motor or load.

While specific embodiments have been described in detail and in the foregoing detailed description and illustrated in the accompanied drawings, those with ordinary skill in the art will appreciate that various modifications and alternatives to those details could be developed in light of the overall teachings of the disclosure. Accordingly, the specific embodiments disclosed and particular ranges disclosed were meant to be illustrative only and not limited as to the scope of the invention, which is to be given the full breath of the appended claims and any and all equivalents thereof.

What is claimed is:

1. A method comprising:
   placing a load attachment portion of a coupling in concentric contact with a first shaft operably connected to a load, the coupling thereby applying a uniform concentric contact force on the first shaft;
   placing a motor attachment portion of the coupling in concentric contact with a second shaft operably connected to a line-start synchronous motor, the coupling thereby applying a uniform concentric contact force on the second shaft;
   increasing the concentric contact force applied by the coupling to the first shaft;
   increasing the concentric contact force applied by the coupling to the second shaft; and
   driving the load with the motor from start to synchronous speed during steady state operation of the motor;
   wherein placing the motor attachment portion of the coupling in concentric contact with the second shaft operably connected to the line-start synchronous motor step includes placing the motor attachment portion of the coupling in concentric contact with the second shaft operably connected to the line start permanent magnet motor.

2. The method of claim 1, wherein placing the motor attachment portion step includes placing a keyless motor attachment portion on a keyless second shaft.

3. The method of claim 1, wherein increasing the contact force applied by the coupling to the second shaft step includes increasing the contact force between a first tapered surface of a first member of a bushing assembly and second tapered surface of a second member of a bushing assembly complementary to the first tapered surface.

4. The method of claim 1, wherein increasing the contact force applied by the coupling to the second shaft step includes increasing a maximum frictional force between the motor shaft attachment portion and the motor shaft with an interference fit therebetween.

5. The method of claim 1, wherein increasing the contact force applied by the coupling to the second shaft step includes increasing the maximum frictional force between the motor shaft attachment portion and the motor shaft by heat shrinking the motor shaft attachment portion to the motor shaft.

6. The method of claim 1, wherein the placing a motor attachment portion of the coupling in concentric contact with a second shaft operably connected to a line-start synchronous motor step includes placing the motor attachment portion of the coupling in concentric contact with a second shaft operably connected to a line start interior permanent magnet motor.

7. A method comprising:
   accessing a line-start permanent magnet synchronous motor;
   accessing a load to be driven by the motor;
   operatively coupling the load to a shaft of the motor with a coupling; and
   driving the load from start to synchronous speed during steady state operation of the motor with the load coupled thereto;
   wherein the coupling has a motor shaft attachment portion and a load attachment portion, and the step of operatively coupling the load to the shaft includes placing the motor shaft attachment portion in concentric contact with the shaft of the motor and operatively connecting the load attachment portion to the load; and
   wherein the step of placing the motor shaft attachment portion in concentric contact with the shaft of the motor includes increasing a contact force between a first tapered surface of a first member of a bushing assembly and a second tapered surface of a second member of the bushing assembly that is complementary to the first tapered surface.

8. The method of claim 7, wherein the operatively coupling the load to a shaft of the motor step includes placing a keyless motor shaft attachment portion on a keyless motor shaft.

9. A method comprising:
   accessing a line-start permanent magnet synchronous motor;
   accessing a load to be driven by the motor;
   operatively coupling the load to a shaft of the motor with a coupling; and
   driving the load from start to synchronous speed during steady state operation of the motor with the load coupled thereto;
   wherein the coupling has a motor shaft attachment portion and a load attachment portion, and the step of operatively coupling the load to the shaft includes placing the motor shaft attachment portion in concentric contact with the shaft of the motor and operatively connecting the load attachment portion to the load; and
   wherein the step of placing the motor shaft attachment portion in concentric contact with the shaft of the motor includes configuring an interior diameter surface of the motor shaft attachment portion to provide an interference fit with the motor shaft.

10. The method of claim 9, wherein the step of coupling the load to the motor with the coupling, includes heat shrinking the motor shaft attachment portion to the motor shaft.

11. The method of claim 7, wherein the accessing the line-start permanent magnet synchronous motor step includes accessing the line start interior permanent magnet motor.

12. The method of claim 9, wherein the accessing the line-start permanent magnet synchronous motor step includes accessing a line start interior permanent magnet motor.

* * * * *